(12) United States Patent
He et al.

(10) Patent No.: US 11,977,992 B2
(45) Date of Patent: May 7, 2024

(54) METHOD FOR TUNING PREDICTIVE CONTROL PARAMETERS OF BUILDING ENERGY CONSUMPTION SYSTEM BASED ON FUZZY LOGIC

(71) Applicant: Xi'an University of Architecture and Technology, Xi'an (CN)

(72) Inventors: Ning He, Xi'an (CN); Gongbo Xu, Xi'an (CN)

(73) Assignee: XI'AN UNIVERSITY OF ARCHITECTURE AND TECHNOLOGY, Xi'an (CN)

( * ) Notice: Subject to any disclaimer, the term of this patent is extended or adjusted under 35 U.S.C. 154(b) by 656 days.

(21) Appl. No.: 17/235,640

(22) Filed: Apr. 20, 2021

(65) Prior Publication Data

US 2022/0114465 A1   Apr. 14, 2022

(30) Foreign Application Priority Data

Oct. 14, 2020   (CN) .......................... 202011099045.0

(51) Int. Cl.
*G06N 5/048*     (2023.01)
*G05B 19/042*    (2006.01)

(52) U.S. Cl.
CPC ........... *G06N 5/048* (2013.01); *G05B 19/042* (2013.01); *G05B 2219/2639* (2013.01)

(58) Field of Classification Search
CPC . G06N 5/048; G06N 3/12; G06N 7/02; G05B 19/042; G05B 2219/2639; G05B 2219/32021; G05B 13/042; Y02P 70/10
See application file for complete search history.

(56) References Cited

U.S. PATENT DOCUMENTS

2022/0082280 A1\*  3/2022  Douglas .................... F24F 3/16

FOREIGN PATENT DOCUMENTS

CN     111224434 A  \*  6/2020  ............... H02J 3/24

\* cited by examiner

*Primary Examiner* — Chad G Erdman
(74) *Attorney, Agent, or Firm* — Leason Ellis LLP

(57) ABSTRACT

A method for tuning predictive control parameters of a building energy consumption system based on fuzzy logic: 1) constructing a controlled building energy consumption system, performing generalized predictive control on the building energy consumption system, and initializing an tuned parameter λ of a generalized predictive controller; 2) collecting the output slope $y_k$ (t), the actual output y(t), the set value $y_r$(t) and the predicted output value ŷ(t+i) of the controlled building energy consumption system in the control process, and then taking them as fuzzy target parameters; 3) constructing a membership function for the fuzzy target parameters in step 2), and then optimally selecting the parameters of the fuzzy membership function by using a particle swarm optimization algorithm to obtain membership function parameters of each fuzzy target parameter; 4) carrying out fuzzy reasoning operation on the membership function parameters, and tuning the adjusted parameter λ by using the results of fuzzy reasoning operation.

8 Claims, 3 Drawing Sheets

| $v$ | $v_{min}$ | $v_{max}$ | $p_1$ | $p_2$ |
|---|---|---|---|---|
| $y_k(t)$ | 0.4 | 0.4 | 1 | 0 |
| $e(t)$ | 0.1 | 0.3 | 0.2 | 0.75 |
| ts(t) | 0.15 | 0.75 | 0.1 | 0.1 |
| $\hat{y}(t+i)$ | 0.3 | 1 | 0 | 0.3 |

METHOD FOR TUNING PREDICTIVE CONTROL PARAMETERS OF BUILDING ENERGY CONSUMPTION SYSTEM BASED ON FUZZY LOGIC

CROSS REFERENCE TO RELATED APPLICATION

This patent application claims the benefit and priority of Chinese Patent Application No. 202011099045.0 filed on Oct. 14, 2020, the disclosure of which is incorporated by reference herein in its entirety as part of the present application.

TECHNICAL FIELD

The present disclosure relates to a method for tuning predictive control parameters of a building energy consumption system, and relates to a method for tuning predictive control parameters of a building energy consumption system based on fuzzy logic.

BACKGROUND

Under the background of economic globalization, the living standard of modern human beings is constantly improving, and thereupon, the global energy consumption is increasing year by year. Problems such as energy shortage, uneven distribution of energy resources and unsynchronized energy supply and demand are being paid urgent attention to by countries all over the world. Building energy consumption accounts for about one third of total energy consumption in China, and one quarter of the energy consumption can be effectively controlled in the operation of a building energy consumption system. Therefore, it is necessary to regulate and control the whole energy consumption system to improve the utilization rate of energy consumption, so as to achieve the purpose of energy conservation. According to the main energy consumption system of modern buildings such as air conditioners, the present disclosure uses advanced control algorithms to control energy conservation.

Model Predictive Control (MPC) is a multivariable control strategy based on optimization theory. Its main characteristics are that it can deal with the coupling problem of a multivariable system and explicitly consider the physical constraints of system input and output amount. However, when this algorithm is applied to some complex industrial production, it has some limitations, because all kinds of minimum variance controllers must require the time delay of the target to be determined, otherwise the control accuracy of the whole system will become very poor. Under such a background, scholars put forward generalized predictive control (GPC) based on on-line identification, output prediction and minimum variance control by absorbing the strategy of rolling optimization in dynamic matrix control and model algorithm control. This control algorithm is one of the most promising advanced control strategies at present, and it is widely used in a building energy consumption system.

However, most building energy consumption systems have the characteristics of multivariate, strong lag and strong nonlinearity, which leads to a large number of design parameters of GPC cost function. The improper tuning of parameters often leads to poor control quality of the system, which seriously affects the control performance of a building energy consumption system.

To sum up, there is an urgent need for a method for tuning predictive control parameters of a building energy consumption system based on fuzzy logic.

SUMMARY

The purpose of the present disclosure is to overcome the above shortcomings of the prior art, and to provide a method for tuning predictive control parameters of a building energy consumption system based on fuzzy logic, which can effectively improve the control performance of a building energy consumption system.

In order to achieve the above purpose, the method for tuning predictive control parameters of a building energy consumption system based on fuzzy logic of the present disclosure comprises the steps of:

1) constructing a controlled building energy consumption system, performing generalized predictive control on the building energy consumption system, and initializing an adjusted parameter $\lambda$ of a generalized predictive controller;

2) collecting the output slope $y_k(t)$, the actual output $y(t)$, the set value $y_r(t)$ and the predicted output value $\hat{y}(t+i)$ of the controlled building energy consumption system in the control process, and then taking the output slope $y_k(t)$, the actual output $y(t)$, the set value $y_r(t)$ and the predicted output value $\hat{y}(t+i)$ of the controlled building energy consumption system as fuzzy target parameters;

3) constructing a membership function for the fuzzy target parameters in step 2), and then optimally selecting the parameters of the fuzzy membership function by using a particle swarm optimization algorithm to obtain membership function parameters of each fuzzy target parameter, thereby determining the membership function;

4) carrying out fuzzy reasoning operation on the membership of the obtained fuzzy target parameters, and tuning the adjusted parameter $\lambda$ by using the results of fuzzy reasoning operation, thus completing tuning predictive control parameters of the building energy consumption system based on fuzzy logic.

The tuned adjusted parameter $\lambda$ is substituted into the cost function of the next cycle to improve the performance of the controlled building energy consumption system in the next cycle.

In step 1), the controlled building energy consumption system is a variable air volume air-conditioning system, and the dynamic model process transfer function of the controlled building energy consumption system is a first-order time-delay model, namely:

$$\frac{y(s)}{u(s)} = \frac{K}{1+T_s} e^{\tau s} \quad (1)$$

where y is the static pressure of the air supply pipe; u is the fan input frequency; K is the process gain; T is a time constant; $\tau$ is the delay time.

In step 1), the adjusted parameter $\lambda$ of a generalized predictive controller is initialized as $$\begin{bmatrix} 0 \\ \vdots \\ 0 \end{bmatrix}_{(cond+N+d) \times 1} ;$$

where tend is the number of cycles of the predictive control process, N is the predictive time domain, and d is the pure delay in the controlled system model.

In step 2), on the basis of the collected output slope $y_k(t)$ of the controlled building energy consumption system, the output slope $y_k(t)$ of the controlled building energy consumption system is taken as a first fuzzy target parameter:

$$y_k(t) = \begin{cases} 0, & t = 1 \\ \dfrac{y(t) - y(t-1)}{T}, & t > 1 \end{cases} \quad (2)$$

$y_k(t)$ is constrained by $y_{k_{min}} \leq y_k(t) \leq y_{k_{max}}$, where t is the sampling order number, T is the sampling time interval, y(t) is the actual output at the sampling time in the predictive control process, and y(t−1) is the actual output at the previous time in the predictive control process;

on the basis of the collected actual output y(t) and the set value $y_r(t)$, the absolute deviation e(t) between the actual output y(t) and the set value $y_r(t)$ is taken as a second fuzzy target parameter:

$$e(t)=y(t)-y_r(t)(0 \leq e(t) \leq e_{max}) \quad (3)$$

the time ts(t) when the output of the change rate of the absolute deviation e(t) reaches the set value is acquired, and ts(t) is taken as a third fuzzy target parameter:

$$ts(t) = \begin{cases} e(t)/|\dot{e}(t)|, & \dot{e}(t) < 0 \\ 0, & \dot{e}(t) = 0, e(t) = 0 \\ M, & \dot{e}(t) \geq 0, e(t) \neq 0 \end{cases} \quad (4)$$

where $ts_{min} \leq ts(t) \leq ts_{max}$, $\dot{e}(t)=d(e(t))/dt$, M is a constant;

on the basis of the collected predicted output value $\hat{y}(t+i)$, $\hat{y}(t+i)$ is taken as a fuzzy target parameter, which is constrained by:

$$\hat{y}_{min} \leq \hat{y}(t+i) \leq \hat{y}_{max}(i=1,2,\ldots,N)$$

where i=1, 2, . . . , N.

In step 3), the membership function parameters of each fuzzy target parameter are $v_{min}$, $v_{max}$, $p_1$ and $p_2$, where $v_{min}$ and $v_{max}$ are the minimum value and the maximum value of fuzzy target parameters, and $p_1$ and $p_2$ are referred to as fuzzy width.

In step 4), Mamdani fuzzy reasoning method is used to perform fuzzy reasoning operation on membership.

The cost function is:

$$J=E\{\Sigma_{j=N_1}^{N_2}(y(k+j)-y_r(k+j))^2+\Sigma_{j-1}^{N_u}\lambda(j)(\Delta u(k+j-1))^2\} \quad (13)$$

where $N_1$ is the minimum prediction time domain length, when the system time delay d is known, $N_1=d$, $N_2$ is the maximum prediction time domain length, $N_u$ is the control time domain length, $\lambda(j)$ is the control weighting coefficient matrix greater than zero, $\lambda(j)=\lambda$.

The present disclosure has the following beneficial effects.

According to the present disclosure, in the specific operation, the method for tuning predictive control parameters of a building energy consumption system based on fuzzy logic takes the building energy consumption system as a control object, uses fuzzy logic to tune and optimize the parameters of generalized predictive control, and uses the particle swarm optimization algorithm to automatically find the optimal fuzzy membership parameter and determine the membership function. Finally, according to the obtained membership, the adjusted parameter λ is set in a manner of fuzzy reasoning operation, so that the system obtains better dynamic performance and stronger robustness, overcomes the defect of difficult tuning of predictive control parameters in the building energy consumption system, and then improves the control performance of the building energy consumption system.

DETAILED DESCRIPTION

The present disclosure will be described in further detail with reference to the accompanying drawings.

Figure 1:
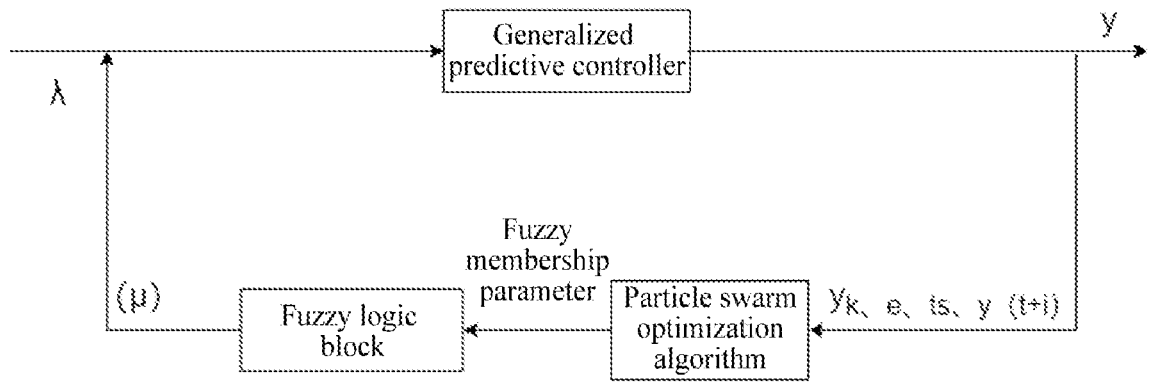
FIG. 1 is a flow chart of the present disclosure.
Figure 2:
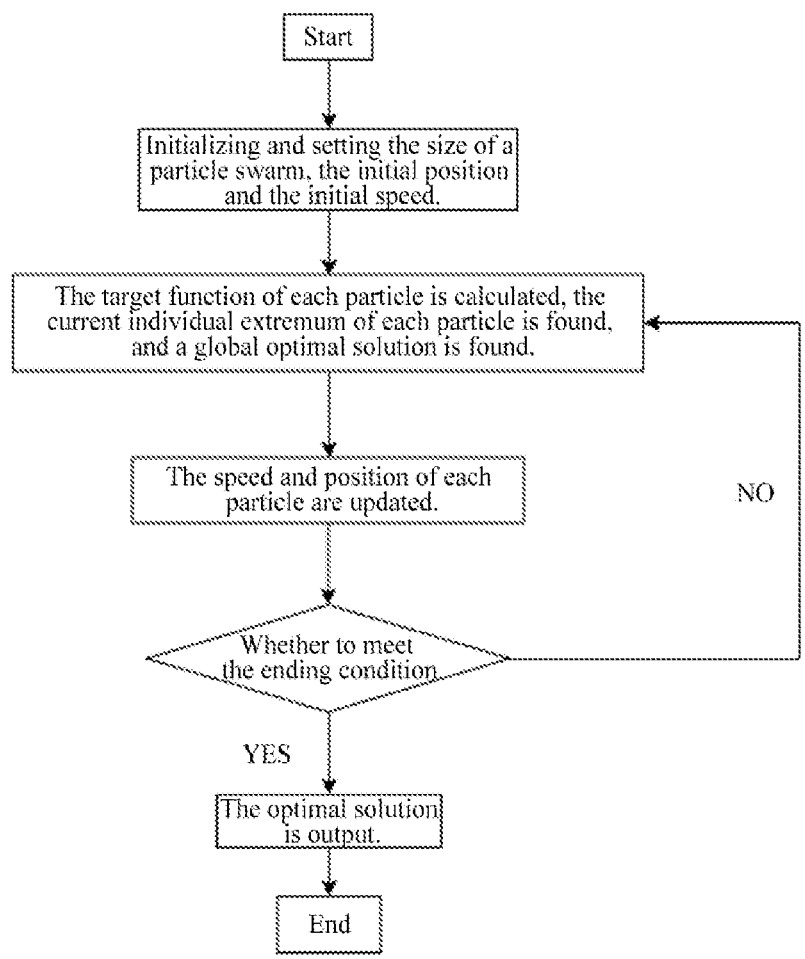
FIG. 2 is a flow chart of a particle swarm optimization algorithm.

Referring to FIG. 1 and FIG. 2, the method for tuning predictive control parameters of a building energy consumption system based on fuzzy logic according to the present disclosure comprises the following steps.

1) A controlled building energy consumption system is constructed, generalized predictive control is performed on the building energy consumption system, and an adjusted parameter λ of a generalized predictive controller is initialized.

In step 1), the controlled building energy consumption system is a variable air volume air-conditioning system, and the dynamic model process transfer function of the controlled building energy consumption system is a first-order time-delay model, namely:

$$\frac{y(s)}{u(s)} = \frac{K}{1+Ts}e^{-\tau s} \quad (1)$$

where y is the static pressure of the air supply pipe; u is the fan input frequency; K is the process gain; T is a time constant; τ is the delay time.

In step 1), the adjusted parameter λ of a generalized predictive controller is initialized as $$\begin{bmatrix} 0 \\ \vdots \\ 0 \end{bmatrix}_{(tend+N+d) \times 1};$$

where tend is the number of cycles of the predictive control process, N is the predictive time domain, and d is the pure delay in the controlled system model.

2) The output slope $y_k(t)$, the actual output y(t), the set value $y_r(t)$ and the predicted output value $\hat{y}(t+i)$ of the controlled building energy consumption system in the control process are collected, and then the output slope $y_k(t)$, the actual output y(t), the set value $y_r(t)$ and the predicted output value $\hat{y}(t+1)$ of the controlled building energy consumption system are taken as fuzzy target parameters.

In step 2), on the basis of the collected output slope $y_k(t)$ of the controlled building energy consumption system, the output slope $y_k(t)$ of the controlled building energy consumption system is taken as a first fuzzy target parameter:

$$y_k(t) = \begin{cases} 0, & t = 1 \\ \dfrac{y(t) - y(t-1)}{T}, & t > 1 \end{cases} \quad (2)$$

$y_k(t)$ is constrained by $y_{k_{min}} \leq y_k(t) \leq y_{k_{max}}$, where t is the sampling order number, T is the sampling time interval, y(t) is the actual output at the sampling time in the predictive control process, and y(t−1) is the actual output at the previous time in the predictive control process.

On the basis of the collected actual output y(t) and the set value $y_r(t)$, the absolute deviation e(t) between the actual output y(t) and the set value $y_r(t)$ is taken as a second fuzzy target parameter:

$$e(t) = y(t) - y_r(t) \, (0 \leq e(t) \leq e_{max}) \quad (3)$$

The time ts(t) when the output of the change rate of the absolute deviation e(t) reaches the set value is acquired, and ts(t) is taken as a third fuzzy target parameter:

$$ts(t) = \begin{cases} e(t)/|\dot{e}(t)|, & \dot{e}(t) < 0 \\ 0, & \dot{e}(t) = 0, e(t) = 0 \\ M, & \dot{e}(t) \geq 0, e(t) \neq 0 \end{cases} \quad (4)$$

where $ts_{min} \leq ts(t) \leq ts_{max}$, $\dot{e}(t) = de(t)/dt$, M is a constant.

On the basis of the collected predicted output value $\hat{y}(t+i)$, $\hat{y}(t+i)$ is taken as a fuzzy target parameter, which is constrained by:

$$\hat{y}_{min} \leq \hat{y}(t+i) \leq \hat{y}_{max} (i=1, 2, \ldots, N)$$

where i=1, 2, ..., N.

3) A membership function is constructed for the fuzzy target parameters in step 2), and then the parameters of the fuzzy membership function are optimally selected by using a particle swarm optimization algorithm to obtain membership function parameters of each fuzzy target parameter, thereby determining the membership function.

In step 3), the membership function parameters of each fuzzy target parameter are $v_{min}$, $v_{max}$, $p_1$ and $p_2$, where $v_{min}$ and $v_{max}$ are the minimum value and the maximum value of fuzzy target parameters, and $p_1$ and $p_2$ are referred to as fuzzy width.

Figures 3, 4:
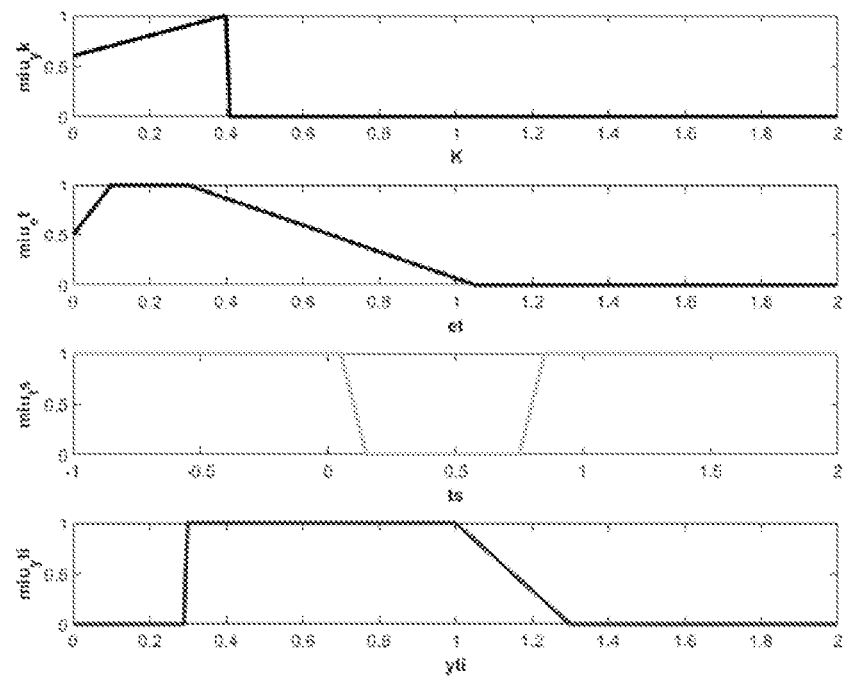
FIG. 3 is a schematic diagram of a fuzzy membership parameter table according to the present disclosure.
FIG. 4 is a schematic diagram of a fuzzy membership function according to the present disclosure.

Referring to FIG. 3, the specific process of step 3) is as follows.

31) The number of particles in the particle swarm is set, the speed and the position of all particles are initialized, and the maximum speed interval is set. The position information of each particle comprises 16 membership function parameters, namely:

$$\begin{bmatrix} v_{1min} & v_{1max} & p_{11} & p_{21} \\ v_{2min} & v_{2max} & p_{12} & p_{22} \\ v_{3min} & v_{3max} & p_{13} & p_{23} \\ v_{4min} & v_{4max} & p_{14} & p_{24} \end{bmatrix}$$

32) The fitness function of each particle is calculated, the current individual extremum of each particle is found, and a global optimal solution is found from these individual historical optimal solutions and is compared with the historical optimal solution to select the optimal solution as the current historical optimal solution.

33) The speed and position information of each particle is updated, and the update formula is:

$$V_{id} = \omega V_{id} + C_1 \text{random}(0,1)(P_{id} - X_{id}) + C_2 \text{random}(0,1) (P_{gd} - X_{id}) \quad (5)$$

$$X_{id} = X_{id} + V_{id} \quad (6)$$

where ω is an inertia factor, ω is non-negative, $V_{id}$ is the particle velocity, $X_{id}$ is the current position of a particle, a four-dimensional matrix consists of four groups of membership function parameters, $P_{id}$ is the historical optimal position of particles, $P_{gd}$ is the global optimal position of a swarm, $C_1$ and $C_2$ are learning factors which are usually 0-4, and random(0,1) is a random number in the interval [0,1].

34) It is detected whether the updated particles meet the condition of ending the cycle, if not, continuing the cycle, if so, outputting the optimal solution as the parameter of the fuzzy membership function, and establishing the membership function to obtain the required membership. The membership functions established by the present disclosure are as follows:

$$\mu_{y_k} = \begin{cases} 0 & y_k < y_{k_{min}} - p_1 \\ 1 + \dfrac{y_k(t) - y_{k_{min}}}{p_1}, & y_{k_{min}} - p_1 \leq y_k(t) < y_{k_{min}} \\ 1, & y_{k_{min}} \leq y_k(t) < y_{k_{max}} \\ 1 - \dfrac{y_k(t) - y_{k_{min}}}{p_2}, & y_{k_{max}} \leq y_k(t) < y_{k_{max}} + p_2 \\ 0, & y_{k_{max}} + p_2 \leq y_k(t) \end{cases} \quad (7)$$

$$\mu_e = \mu_{e(t)}(e(t)) = \begin{cases} 1, & 0 \leq e(t) < e_{max} \\ 1 - \dfrac{e(t) - e_{max}}{p_2}, & e_{max} \leq e(t) < e_{max} + p_2 \\ 0, & e(t) \geq e_{max} + p_2 \end{cases} \quad (8)$$

$$\mu_{ts} = \begin{cases} \dfrac{ts_{min} - ts(t)}{p_1}, & ts_{min} - p_1 \leq ts(t) < ts_{min}, \dot{e}(t) < 0 \\ 0, & ts_{min} \leq ts(t) < ts_{max}, \dot{e}(t) < 0 \\ \dfrac{ts(t) - ts_{max}}{p_2}, & ts_{max} \leq ts(t) < ts_{max} + p_2, \dot{e}(t) < 0 \\ 1, & ts(s) < ts_{min} - p_1, \dot{e}(t) < 0 \\ 1, & ts(t) \geq ts_{max} + p_s, \dot{e}(t) < 0 \\ 0, & \dot{e}(t) = 0, e(t) = 0 \\ 1, & \dot{e}(t) \geq 0, e(t) \neq 0 \end{cases} \quad (9)$$

-continued $$\mu_{\hat{y}}(i) = \tag{10}$$

$$\mu_{\hat{y}(t+i)}(\hat{y}(t+i)) = \begin{cases} 0, & \hat{y}(t+i) < \hat{y}_{min} - p_1 \\ 1 + \dfrac{\hat{y}(t+i) - \hat{y}_{min}}{p_1}, & \hat{y}_{min} - p_1 \le \hat{y}(t+i) < \hat{y}_{min} \\ 1, & \hat{y}_{min} \le \hat{y}(t+i) < \hat{y}_{max} \\ 1 - \dfrac{\hat{y}(t+i) - \hat{y}_{max}}{p_2}, & \hat{y}_{max} \le \hat{y}(t+i) < \hat{y}_{max} + p_2 \\ 0, & \hat{y}_{max} + p_2 \le \hat{y}(t+i) \end{cases}$$

where i=1, 2, ..., N.

4) Fuzzy reasoning operation is carried out on the membership, and the adjusted parameter λ is tuned by using the results of fuzzy reasoning operation, thus completing tuning predictive control parameters of the building energy consumption system based on fuzzy logic.

In step 4), Mamdani fuzzy reasoning method is used to perform fuzzy reasoning operation on membership, which is specifically as follows.

41) The most commonly used Mamdani fuzzy reasoning method is used, and the obtained membership is subject to Cartesian product operation, namely:

$$\mu_{min} = \mu_{yk} \wedge \mu_e \wedge \mu_{ts} \wedge (\min\{\mu_{\hat{y}}(1), \mu_{\hat{y}}(2), \ldots, \mu_{\hat{y}}(N)\}) \tag{11}$$

where the index $y_k(t)$ is the slope of the output curve, which is directly related to the increase and decrease of the output curve at each moment. Taking this index as a fuzzy target parameter to adjust the system output can directly influence the trend of the output curve. The index ts(t) contains the prediction amount of the rise time of the system. The indexes e(t) and ŷ(t+i) describe the difference between the current and predicted system output and the set value.

42) According to the $\mu_{min}$ value obtained in step 31), λ is tuned between $\lambda_{min}$ and $\lambda_{max}$ according to a certain exponential law, and the weight of the control quantity is changed, whose algebraic expression is:

$$\lambda = \lambda_{max} \times \exp(\mu_{min} \times lg(\lambda_{min}/\lambda_{max})) \tag{12}$$

where $\lambda_{max} > \lambda_{min} > 0$.

5) The tuned adjusted parameter λ is substituted into the cost function of the next cycle to improve the performance of the controlled building energy consumption system in the next cycle, wherein the cost function is:

$$J = E\{\Sigma_{j=N_1}^{N_2}(y(k+j) - y_r(k+j))^2 + \Sigma_{j=1}^{N_u} \lambda(j)(\Delta u(k+j-1))^2\} \tag{13}$$

where $N_1$ is the minimum prediction time domain length, when the system time delay d is known, $N_1$=d, $N_2$ is the maximum prediction time domain length, $N_u$ is the control time domain length, λ(j) is the control weighting coefficient matrix greater than zero, λ(j)=λ.

Embodiment 1

In the variable air volume air-conditioning system, the static pressure of an air supply pipe in the static pressure control loop of central air-conditioning supply is taken as the controlled object, and the fan frequency-static pressure model is obtained by system identification with the objective that the output of the static pressure prediction model can quickly and accurately follow the set value of static pressure, as shown in the following formula:

$$G(s) = \dfrac{4.193 e^{-4.87s}}{6.219s + 1} \tag{10}$$

The method specifically comprises the following steps.

1) The building energy consumption system is modeled, generalized predictive control is performed, and an tuned parameter λ is initialized.

The tuned parameter λ of a generalized predictive controller is initialized as $$\begin{bmatrix} 0 \\ \vdots \\ 0 \end{bmatrix}_{(tend+N+d) \times 1};$$

where tend is 200, N is the predictive time domain which is 5, and d is the pure delay in the controlled system model, which is 4.

2) In the process of collecting control, the system includes the output slope $y_k(t)$, the actual output y(t), the set value $y_r(t)$ and the predicted output value ŷ(t+i). On the basis of the collected output slope $y_k(t)$ of the controlled system, the output slope is taken as a first fuzzy target parameter and is constrained by $0 \le y_k(t) \le 0.4$:

$$y_k(t) = \begin{cases} 0, & t = 1 \\ \dfrac{y(t) - y(t-1)}{T}, & t > 1 \end{cases} \tag{11}$$

where t is the sampling order number which is 200 times in total, T is the sampling time interval which is 1 s, y(t) is the actual output at the sampling time in the predictive control process, and y(t−1) is the actual output at the previous time in the predictive control process.

On the basis of the collected actual output y(t) and the set value $y_r(t)$, the absolute deviation between the actual output y(t) and the set value $y_r(t)$ is taken as a fuzzy target parameter:

$$e(t) = y(t) - y_r(t) (0 \le e(t) \le 0.3) \tag{12}$$

The time ts(t) when the output based on the change rate of the absolute deviation e(t) reaches the set value is acquired:

$$ts(t) = \begin{cases} e(t)/|\dot{e}(t)|, & \dot{e}(t) < 0 \\ 0, & \dot{e}(t) = 0, e(t) = 0 \\ M, & \dot{e}(t) \ge 0, e(t) \ne 0 \end{cases} \tag{13}$$

where $0.15 \le ts(t) \le 0.75$, $\dot{e}(t) = d(e(t))/dt$, M is a big constant.

On the basis of the collected predicted output value ŷ(t+i), ŷ(t+i) is taken as a fuzzy target parameter, which is constrained by:

$$0.3 \le \hat{y}(t+i) \le 1 (i=1,2,\ldots,N)$$

where i=1, 2, ..., N.

3) A membership function is constructed for the four collected fuzzy target parameters. In the present disclosure, the parameters of the fuzzy membership function are optimally selected by using a particle swarm optimization algorithm, so that each fuzzy target parameter can obtain four membership function parameters, namely, $v_{min}$, $v_{max}$, $p_1$, $p_2$, where $v_{min}$ and $v_{max}$ are the minimum value and the maximum value of fuzzy target parameters, and $p_1$ and $p_2$ are referred to as fuzzy width.

The specific operation process of step 3) is as follows.

31) The number of particles in the particle swarm is set as 50, the speed and the position of all particles are initialized, and the maximum speed interval is set. The position information of each particle comprises 16 membership function parameters, namely:

$$\begin{bmatrix} v_{1min} & v_{1max} & p_{11} & p_{21} \\ v_{2min} & v_{2max} & p_{12} & p_{22} \\ v_{3min} & v_{3max} & p_{13} & p_{23} \\ v_{4min} & v_{4max} & p_{14} & p_{24} \end{bmatrix}$$

32) The fitness function of each particle is calculated, the current individual extremum of each particle is found, and a global optimal solution is found from these individual historical optimal solutions and is compared with the historical optimal solution to select the optimal solution as the current historical optimal solution.

33) The speed and position information of each particle is updated, and the update formula is:

$$V_{id} = \omega V_{id} + C_1 \text{random}(0,1)(P_{id} - X_{id}) + C_2 \text{random}(0,1)(P_{gd} - X_{id}) \quad (14)$$

$$X_{id} = X_{id} + V_{id} \quad (15)$$

where $\omega$ is an inertia factor, $\omega$ has a value of 0.85, $V_{id}$ is the particle velocity, $X_{id}$ is the current position of a particle, a four-dimensional matrix consists of four groups of membership function parameters, $P_{id}$ is the historical optimal position of particles, $P_{gd}$ is the global optimal position of a swarm, $C_1$ and $C_2$ are learning factors which are usually 0.5, and random(0,1) is a random number in the interval [0,1].

34) It is detected whether the updated particles meet the condition of ending the cycle, if not, continuing the cycle, if so, outputting the optimal solution as the parameter of the fuzzy membership function to obtain the parameter as shown in FIG. 3, and establishing the membership function as shown in FIG. 4 to obtain the required membership. The membership functions established by the present disclosure are as follows:

$$\mu_{y_k} = \begin{cases} 0, & y_k < -0.6 \\ 1 + \dfrac{y_k(t) - 0.4}{1}, & -0.6 \leq y_k(t) < 0.4 \\ 0, & 0.4 < y_k(t) \end{cases} \quad (16)$$

$$\mu_e = \mu_{e(t)}(e(t)) = \begin{cases} 1, & 0 \leq e(t) < 0.1 \\ 1 - \dfrac{e(t) - 0.3}{0.75}, & 0.3 \leq e(t) < 1.05 \\ 0, & e(t) \geq 1.05 \end{cases} \quad (17)$$

$$\mu_{ts} = \begin{cases} \dfrac{0.15 - ts(t)}{0.1}, & 0.05 \leq ts(t) < 0.15, \dot{e}(t) < 0 \\ 0, & 0.15 \leq ts(t) < 0.75, \dot{e}(t) < 0 \\ \dfrac{ts(t) - 0.75}{0.1}, & 0.75 \leq ts(t) < 0.85, \dot{e}(t) < 0 \\ 1, & ts(s) < 0.05, \dot{e}(t) < 0 \\ 1, & ts(t) \geq 0.85, \dot{e}(t) < 0 \\ 0, & \dot{e}(t) = 0, e(t) = 0 \\ 1, & \dot{e}(t) \geq 0, e(t) \neq 0 \end{cases} \quad (18)$$

-continued $$u_{\hat{y}}(i) = \mu_{\hat{y}(t+i)}(\hat{y}(t+i)) = \begin{cases} 0, & \hat{y}(t+i) < 0.03 \\ 1, & 0.3 \leq \hat{y}(t+i) < 1 \\ 1 - \dfrac{\hat{y}(t+i) - 1}{0.3}, & 1 \leq \hat{y}(t+i) < 1.3 \\ 0, & 1.3 \leq \hat{y}(t+i) \end{cases} \quad (19)$$

where i=1, 2, ..., N.

4) Fuzzy reasoning operation is carried out on the membership of fuzzy target parameters, and the adjusted parameter $\lambda$ is tuned by using the results of fuzzy reasoning operation.

The specific process of step 4) is as follows.

41) The Mamdani fuzzy reasoning method is used, and the obtained membership is subject to Cartesian product operation, namely:

$$\mu_{min} = \mu_{y,k} \wedge \mu_e \wedge \mu_{ts} \wedge (\min\{\mu_{\hat{y}}(1), \mu_{\hat{y}}(2), \ldots, \mu_{\hat{y}}(N)\}) \quad (20)$$

where, $y_k(t)$ is the slope of the output curve, which is directly related to the increase and decrease of the output curve at each moment. Taking this index as a fuzzy target parameter to tune the system output can directly influence the trend of the output curve. The index ts(t) contains the prediction amount of the rise time of the system. The indexes e(t): and $\hat{y}(t+i)$ describe the difference between the current and predicted system output and the set value.

42) According to the $\mu_{min}$ value, $\lambda$ is tuned between $\lambda_{min}$ and $\lambda_{max}$ according to a certain exponential law, and the weight of the control quantity is changed, whose algebraic expression is:

$$\lambda = \lambda_{max} \times \exp(\mu_{min} \times lg(\lambda_{min}/\lambda_{max})) \quad (21)$$

where $\lambda_{max} = 3$; $\lambda_{min} = 0.001$.

5) The tuned weighting coefficient $\lambda$ is substituted into the cost function of the next cycle again, wherein the cost function is:

$$J = E\{\Sigma_{j=N_1}^{N_2}(y(k+j) - y_r(k+j))^2 + \Sigma_{j=1}^{N_u} \lambda(j)(\Delta u(k+j-1))^2\} \quad (22)$$

where $N_1$ is the minimum prediction time domain length, which is selected as 1, when the system time delay d is known, $N_1 = d = 4$, $N_2$ is the maximum prediction time domain length, which is 5, $N_u$ is the control time domain length, which is 2.

Figure 5:
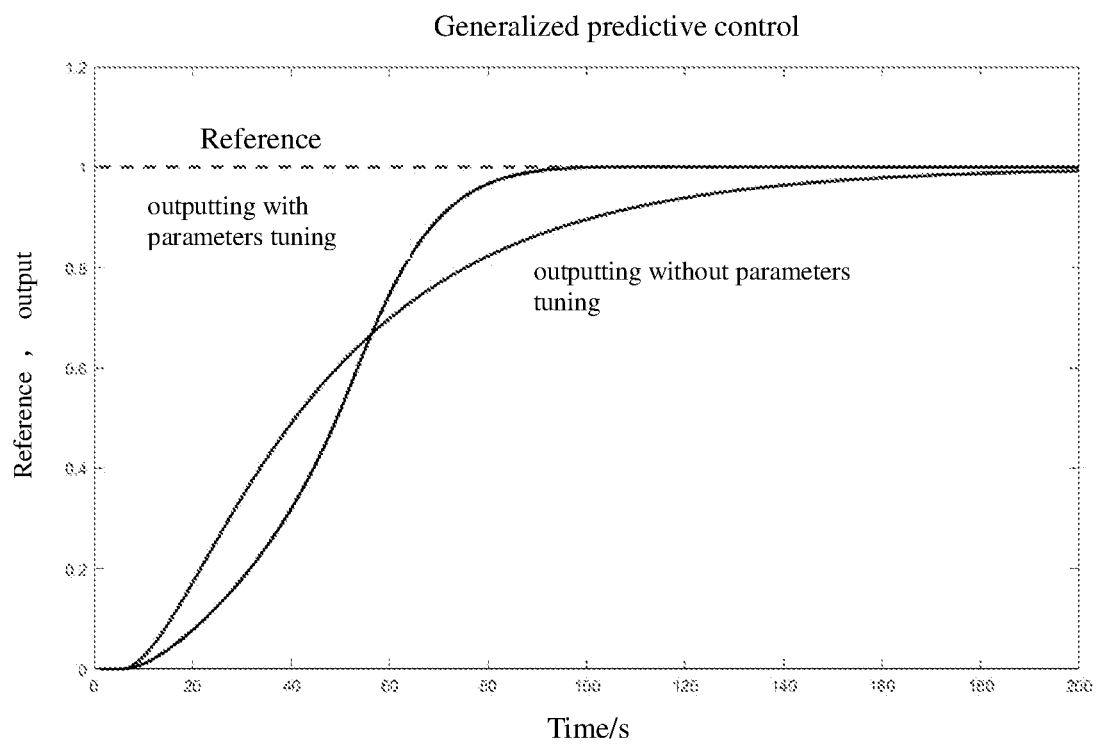
FIG. 5 is a comparison diagram of system simulation output curves according to the present disclosure.

According to the present disclosure, the variable air volume air-conditioning system is predicted, controlled and simulated, and the result is shown in FIG. 5. It can be seen that the rapidity and stability of the variable air volume air-conditioning system are obviously improved, and the result shows the effectiveness of the present disclosure.

Figure 6:
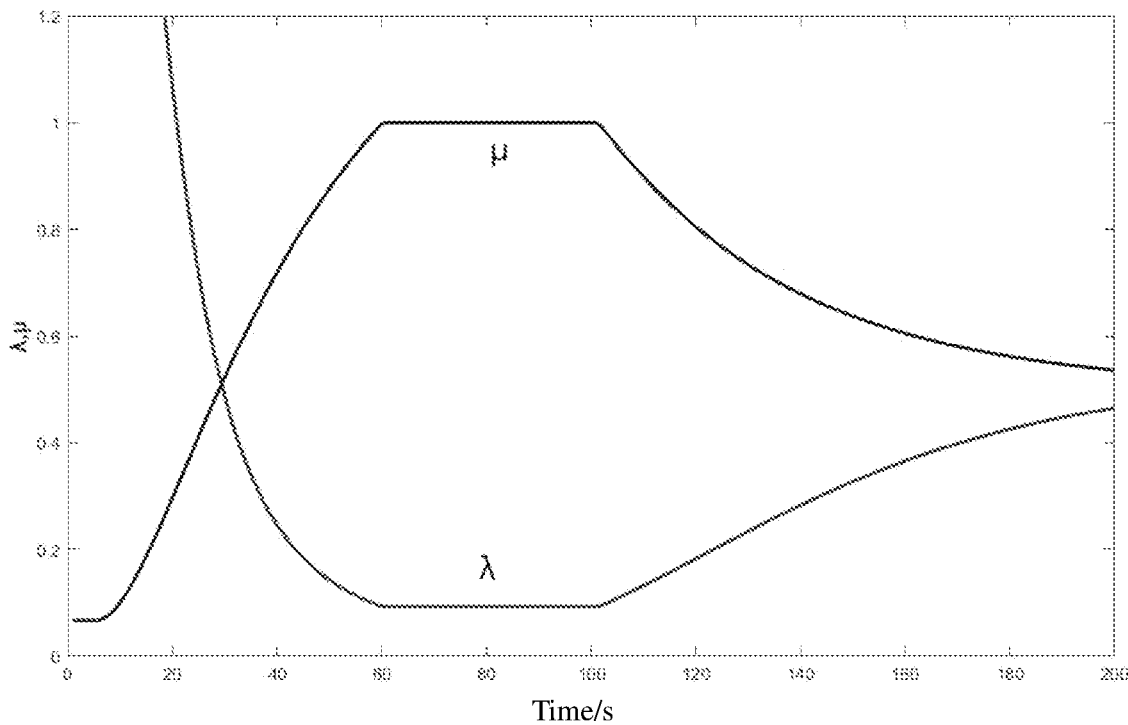
FIG. 6 is a graph showing the variation of the adjusted parameters according to the present disclosure.

In addition, as shown in FIG. 6, compared with FIG. 5, it can be seen that with the change of $\lambda$ value from large to small, the response speed of the corresponding system is accelerated, and the control function is enhanced, so that the system can reach the set stable state faster, which proves reversely that the weighting coefficient $\lambda$ of the controller has a direct influence on the control process.

Compared with the prior art, the present disclosure has the following advantages.

The underutilized output slope, predicted output and other information containing many system characteristics in the generalized predictive control process are applied to the fuzzy logic algorithm to tune the control system parameters, which improves the utilization rate of the control system.

By constructing the fuzzy membership function, the constraints on performance indexes such as rise time and overshoot in the system are transformed into constraints on four fuzzy control targets, which greatly reduces the calculation amount in the process of tuning parameters.

Only the weighting coefficient λ of the control quantity is taken as an adjustable parameter, and other control parameters such as a flexibility coefficient and a control time domain are fixed quantities, so that the contradiction between rapidity and stability of the control system can be solved most effectively.

By applying the system output slope at each moment and the time when the output based on the current absolute error change rate reaches the set value to the parameter tuning, the adjustment time of the system can be effectively shortened.

The absolute deviation between the actual output and the set output and the predicted output are applied to the fuzzy logic algorithm to tune the system parameters, so that the overshoot of the system is smaller and the robustness is stronger.

By using the particle swarm optimization algorithm, the parameters of the fuzzy membership function are found more accurately, so that the present disclosure is more universal.

What is claimed is:

1. A method for tuning one or more predictive control parameters of a building energy consumption system based on fuzzy logic, comprising the steps of:
constructing a controlled building energy consumption system, performing generalized predictive control on the controlled building energy consumption system, and initializing tuned parameter λ of a generalized predictive controller;
collecting the output slope $y_k(t)$, the actual output $y(t)$, the set value $y_r(t)$ and the predicted output value $\hat{y}(t+i)$ of the controlled building energy consumption system as one or more fuzzy target parameters;
constructing a membership function for the one or more fuzzy target parameters, and optimally selecting the fuzzy target parameters of the fuzzy membership function by using a particle swarm optimization algorithm to obtain membership function parameters of a given one of the one or more fuzzy target parameters, thereby determining the membership function;
carrying out a fuzzy reasoning operation on the membership function parameters of the given one of the one or more fuzzy target parameters; and
tuning an adjusted parameter λ by using the results of the fuzzy reasoning operation, thus completing tuning predictive control parameters of the building energy consumption system based on fuzzy logic.

2. The method for tuning one or more predictive control parameters of a building energy consumption system based on fuzzy logic according to claim 1, wherein the adjusted parameter λ is substituted into a cost function of a next cycle to improve the performance of the controlled building energy consumption system in the next cycle.

3. The method for tuning predictive control parameters of a building energy consumption system based on fuzzy logic according to claim 1, wherein constructing the controlled building energy consumption system comprises constructing a variable air volume air-conditioning system, wherein a dynamic model process transfer function of the controlled building energy consumption system is a first-order time-delay model, namely:

$$\frac{y(s)}{u(s)} = \frac{K}{1+Ts}e^{-\tau s}$$

where y is a static pressure of an air supply pipe; u is a fan input frequency; K is a process gain; T is a time constant; and τ is a delay time.

4. The method for tuning predictive control parameters of a building energy consumption system based on fuzzy logic according to claim 1, wherein the adjusted parameter λ is initialized as $$\begin{bmatrix} 0 \\ \vdots \\ 0 \end{bmatrix}_{(t_{end}+N+d)\times 1};$$

where $t_{end}$ is a number of cycles of the predictive control process, N is a predictive time domain, and d is a pure delay in the controlled system model.

5. The method for tuning predictive control parameters of a building energy consumption system based on fuzzy logic according to claim 1, comprising:
taking the output slope $y_k(t)$ of the controlled building energy consumption system as a first fuzzy target parameter:

$$y_k(t) = \begin{cases} 0, & t=1 \\ \dfrac{y(t)-y(t-1)}{T}, & t>1 \end{cases}$$

$y_k(t)$ is constrained by $y_{k_{min}} \leq y_k(t) \leq y_{k_{max}}$, where t is a sampling order number, T is a sampling time interval, y(t) is an actual output at a given sampling time in the predictive control process, and y(t−1) is an actual output at a previous time in the predictive control process;
on the basis of the collected actual output y(t) and the set value $y_r(t)$, taking the absolute deviation e(t) between the actual output y(t) and the set value $y_r(t)$ a second fuzzy target parameter:

$$e(t)=y(t)-y_r(t)(0 \leq e(t) \leq e_{max})$$

a time ts(t) when an output of the change rate of the absolute deviation e(t) reaches a set value is acquired taking ts(t) is taken as a third fuzzy target parameter:

$$ts(t) = \begin{cases} e(t)/|\dot{e}(t)|, & \dot{e}(t) < 0 \\ 0, & \dot{e}(t)=0, e(t)=0 \\ M, & \dot{e}(t) \geq 0, e(t) \neq 0 \end{cases} \quad (4)$$

where $ts_{min} \leq ts(t) \leq ts_{max}$, $\dot{e}(t)=d(e(t))/dt$, M is a constant; and
on the basis of the collected predicted output value, taking $\hat{y}(t+i)$, $\hat{y}(t+i)$ as a fuzzy target parameter, which is constrained by:

$$\hat{y}_{min} \leq \hat{y}(t+i) \leq \hat{y}_{max}(i=1,2,\ldots,N)$$

where i=1, 2, . . . , N.

6. The method for tuning predictive control parameters of a building energy consumption system based on fuzzy logic according to claim 1, wherein the membership function parameters of the given one of the one or more fuzzy target parameters are $v_{min}$, $v_{max}$, $p_1$ and $p_2$, where $v_{min}$ and $v_{max}$ are a minimum value and a maximum value of given one of the one or more fuzzy target parameters, and $p_1$ and $p_1$ are referred to as fuzzy width.

7. The method for tuning predictive control parameters of a building energy consumption system based on fuzzy logic according to claim 1, wherein in a Mamdani fuzzy reasoning method is used to perform the fuzzy reasoning operation on membership.

8. The method for tuning predictive control parameters of a building energy consumption system based on fuzzy logic according to claim 2, wherein the cost function is:

$$J = E\{\Sigma_{j=N_1}^{N_2}(y(k+j)-y_r(k+j))^2 + \Sigma_{j=1}^{N_u}\lambda(j)(\Delta u(k+j-1))^2\} \quad (13)$$

where $N_1$ is a minimum prediction time domain length, when a system time delay d is known, $N_1 = d$, $N_2$ is a maximum prediction time domain length, $N_u$ is a control time domain length, and $\lambda(j)$ is a control weighting coefficient matrix greater than zero, $\lambda(f) = \lambda$.

* * * * *